Feb. 9, 1971  C. W. HEWLETT, JR  3,562,645
FREQUENCY TRANSDUCER UTILIZING PULSE GENERATOR PRODUCING
FREQUENCY-RESPONSIVE, VARIABLE-WIDTH OUTPUT PULSES
Filed June 23, 1967  2 Sheets-Sheet 1

INVENTOR
CLARENCE W. HEWLETT, JR.

BY George A. Herbster
ATTORNEY

United States Patent Office 3,562,645
Patented Feb. 9, 1971

3,562,645
FREQUENCY TRANSDUCER UTILIZING PULSE GENERATOR PRODUCING FREQUENCY-RESPONSIVE, VARIABLE-WIDTH OUTPUT PULSES
Clarence W. Hewlett, Jr., Hampton, N.H., assignor to General Electric Company, a corporation of New York
Filed June 23, 1967, Ser. No. 648,415
Int. Cl. G01r 23/02
U.S. Cl. 324—78                                13 Claims

ABSTRACT OF THE DISCLOSURE

A frequency transducer adapted to be energized by an alternating current signal having means to produce frequency-indicating pulses the width of which varies in response to the measured frequency.

BACKGROUND OF THE INVENTION

This invention relates to the measurement of electrical frequencies and more particularly to frequency transducers.

In the prior art there have been two general approaches for providing a frequency indication for an applied alternating current signal. In one approach the charging or discharging current of a capacitor is measured. However, this current is generally a low current which requires extremely sensitive meters or amplification. The other approach is that of using a multivibrator which is controlled by the signal to be measured. Although both these circuit approaches have been utilized successfully in the prior art, they require either means for measuring low current values or means to provide insensitivity to transients. The addition of either of these means to a frequency transducer increases the cost thereof.

Therefore, it is an object of this invention to provide a frequency transducer which effects an economy of parts and manufacture.

Another object of this invention is to provide a frequency transducer which is adapted for use with standard electrical metering assemblies.

Yet another object of this invention is to provide a frequency transducer the accuracy of which is relatively independent of wave shape.

Still another object of this invention is to provide a frequency transducer which effects an economy of parts without a loss in accuracy in accordance with acceptable metering standards.

SUMMARY

In accordance with one aspect of this invention, one zero crossing of an applied alternating current signal initiates a timing circuit which, in turn, initiates a pulse after a fixed time delay. The pulse continues until the subsequent zero crossing of the applied alternating current signal. Means measure the pulse width to indicate the frequency, the pulse width decreasing with increasing frequency.

This invention is recited in the appended claims. A more thorough understanding of the above objects and advantages of this invention may be had by referring to the following description taken in conjunction with the drawings.

DESCRIPTION OF THE PREFERRED EMBODIMENT

Figure 1:
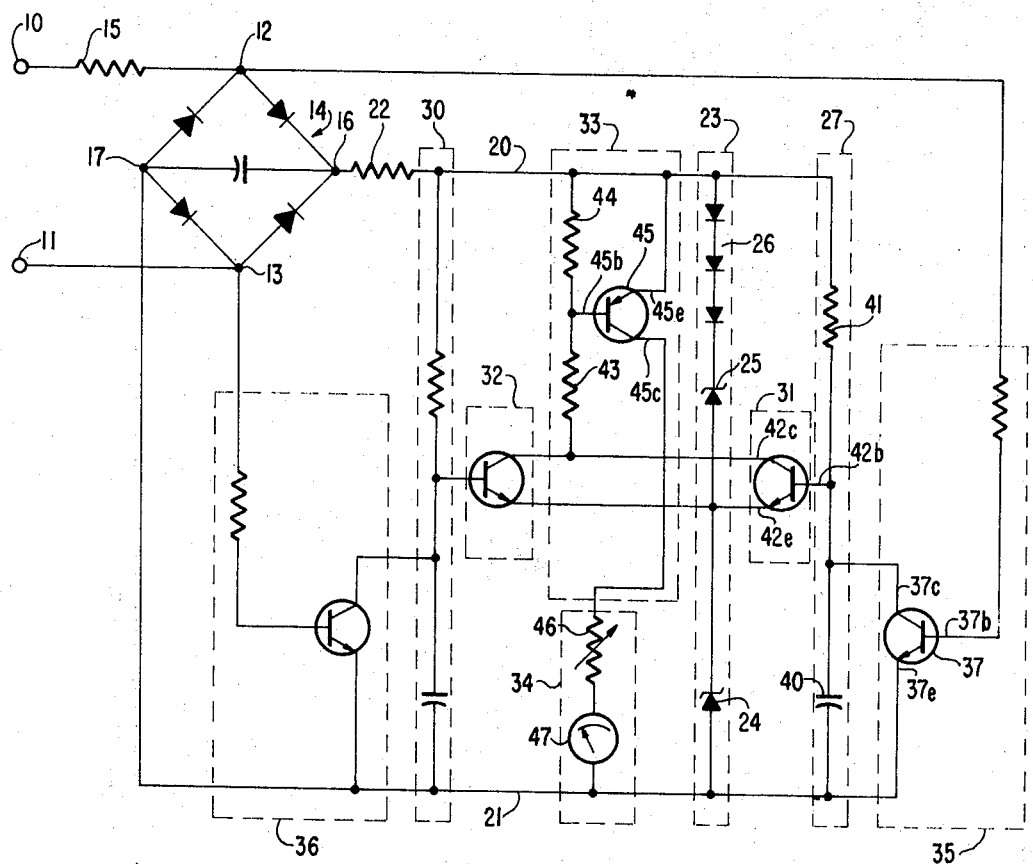
FIG. 1 is a schematic of a frequency transducer constructed in accordance with this invention.

In accordance with this invention, an alternating current signal to be monitored is applied across input terminals 10 and 11 and is coupled to bridge input terminals 12 and 13 of a full wave bridge rectifier 14. To permit a decrease in the rectifier voltage ratings and to provide transient protection, an input resistor 15 is disposed in series between the input terminal 10 and the bridge input terminal 12. A filtered D-C output appears at the bridge output terminals 16 and 17.

Regulated D-C voltage is obtained between a conductor 20 and a conductor 21 by connecting the conductor 20 to the bridge output terminal 16 by means of a dropping resistor 22 and to the conductor 21 by a fixed signal generating means 23 which includes voltage regulating means such as Zener diodes 24 and 25 and temperature compensating diodes 26 in series.

In accordance with this invention, regulated D-C voltages from the fixed signal generating means 23 energize first and second timing circuits 27 and 30, first and second comparator circuits 31 and 32, a pulse generating circuit 33, and an indicating circuit 34. The A-C signals appearing between the bridge input terminals 12 and 13 are applied to first and second zero crossing sensing circuits 35 and 36. This embodiment of the frequency transducer is symmetrical; therefore, its operation can be described in detail with reference to the first timing circuit 27, the first comparator circuit 31, the pulse generating circuit 33, the indicating circuit 34, and the first zero crossing sensing circuit 35 only.

The first zero crossing sensing circuit 35 includes a shunting means constituted by an NPN transistor 37. A base 37b is resistively coupled to the bridge input terminal 12, and the emitter electrode 37e is directly connected to the conductor 21. This transistor shunts a capacitor 40 in the first timing circuit 27, the timing circuit being constituted by a resistor 41 in series with the capacitor 40. The timing circuit 27 is energized by the regulated D-C voltage, and the collector electrode 37c completes the shunting connection. During half-cycles of the applied input frequency when the input terminal 10 is positive, the transistor 37 is conductive, thereby shunting the capacitor 40 and disabling the first timing circuit 27.

During the next half-cycle when the input terminal 10 is negative, the NPN transistor 37 is nonconductive so that the capacitor 40 begins to charge through the resistor 41 substantially simultaneously with the zero crossing. The voltage across the capacitor 40 is applied to the first comparator circuit 31 which is consituted by another NPN transistor 42. Collector 42c is resistively coupled to the conductor 20 while emitter 42e is coupled to the conductor 21 through the Zener diode 24. The base 42b is directly coupled to the junction between the capacitor 40 and the resistor 41. Therefore, the NPN transistor 42 remains nonconductive during the initial portion of the negative half-cycle until the voltage across the capacitor 40 exceeds the Zener diode voltage plus the base-emitter forward bias voltage drop of the NPN transistor 42. For example, if Zener diode 24 has a Zener breakdown voltage of 7.5 volts, the NPN transistor remains nonconductive until the voltage across the capacitor 40 reaches approximately 8 volts if the base-emitter forward bias voltage drop is approximately 0.5 volt.

The collector circuit of the NPN transistor 42 controls the pulse generating circuit 33. The collector 42c is resistively coupled to the conductor 20 by series resistors 43 and 44, and their junction is directly connected to a base 45b of a PNP transistor 45. The emitter 45e is connected to the conductor 20 while the collector 45c is coupled to the conductor 21 through the indicating circuit 34 shown as comprising a variable sensitivity resistor 46 and a meter 47.

When the NPN transistor 42 conducts, the transistor 45 is turned on and initiates a current pulse through the indicating circuit 34. This pulse continues until the positive going zero crossing of the applied A-C signal whereupon the transistor 37 again becomes conductive, discharging the capacitor 40 and turning off the transistor 42. Therefore, the transducer produces a pulse which is initiated a fixed time after a negative going zero crossing of the applied A-C signal and is terminated by the positive going crossing. The pulse width decreases with increasing frequency.

During the half-cycle when the input terminal 10 is negative with respect to the input terminal 11, the second zero crossing sensing circuit 36 disables the timing circuit 30 and the second comparator circuit 32. On half-cycles when the input terminal 10 is positive with respect to the input terminal 11, the second timing circuit 30, the second comparator circuit 32, and the second zero crossing sensing circuit 36 operate to produce another pulse.

Figure 4:
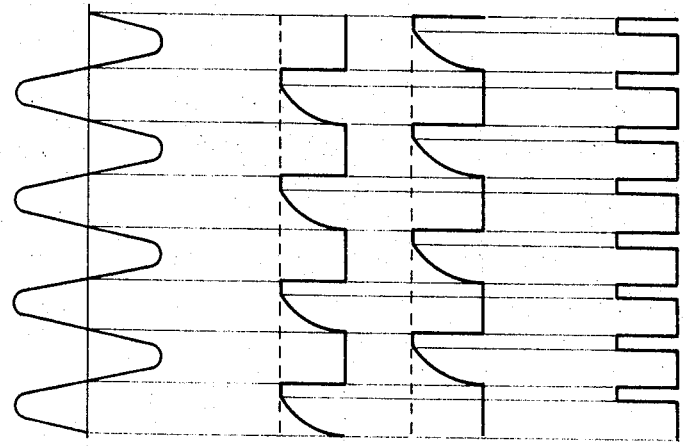
FIGS. 2, 3, and 4 graphically depict the operation of the frequency transducer for three different frequencies of applied alternating current input signals.
Figure 3:
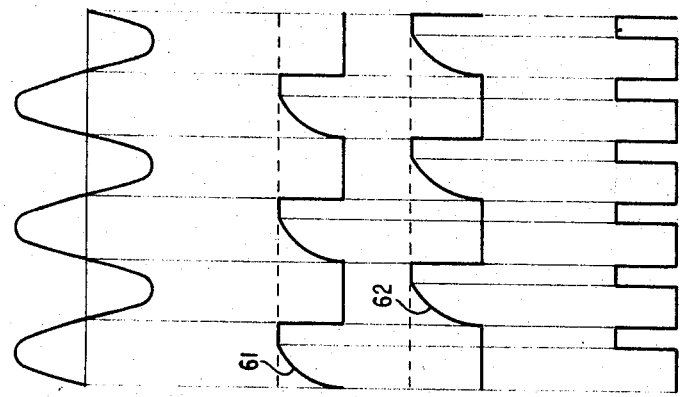
Figure 2:
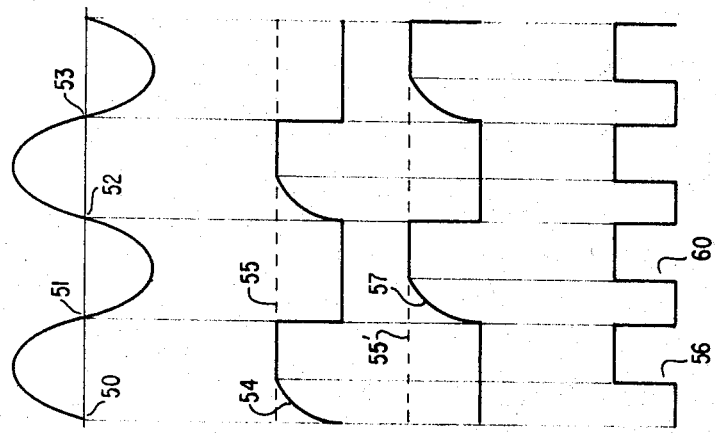

Operation of this frequency transducer can be more readily understood by referring to FIGS. 2, 3, and 4. The frequency of the A-C signal in FIG. 2A is two-thirds that applied in FIG. 3A and one-half the frequency depicted in FIG. 4A. Therefore, the time spans of FIGS. 2A, 3A and 4A are equal.

Now referring to FIGS. 1 and 2 together, FIG. 2A shows an alternating current input having zero crossings designated by numerals 50, 51, 52 and 53. During the half-cycle between the first and second zero crossings 50 and 51, the input terminal 10 is positive with respect to the input terminal 11. Therefore, the first zero crossing sensing means 35 disables the timing circuit 27, but the second zero crossing sensing circuit 36 permits the second timing circuit 30 to be energized. Graph 54 in FIG. 2B illustrates the capacitor charging voltage with time; the dashed line 55 constitutes the capacitor voltage which causes the second comparator circuit 32 to initiate a pulse in the pulse generating circuit 33. As can be seen from this graph and an analysis of the circuit in FIG. 1, the voltage wave shapes applied to the comparator circuit 32 are identical and independent of frequency. With reversal of the input voltage during the subsequent half-cycle, when the second zero crossing sensing circuit 36 shunts the timing circuit 30, the voltage at the comparator circuit 32 is reduced to zero.

When the voltage at the comparator circuit 32 exceeds the firing voltage for the comparator circuit 32, the pulse generating circuit 33 is turned on. The transistor 45 produces a rapid turn-on so that a good approximation of a step function is obtained as shown in the pulse 56 shown in FIG. 2D. This pulse continues until the second zero crossing 51 whereupon the disabling function of the second zero crossing sensing means 36 de-energizes the pulse generating means to produce a step function back to a zero current output.

During the second half-cycle, when the timing circuit 30 is disabled, the timing circuit 27 is enabled and the capacitor 40 charges according to the graph 57, the dashed line 55' representing the capacitor voltage needed to energize the transistor 42. Hence, at the same fixed time interval subsequent to the second zero crossing 51, the first comparator circuit 31 energizes the pulse generating circuit 33 to produce a pulse 60. The third zero crossing 52 terminates the pulse 60.

Each pulse produced by the alternating current signal passes through the meter 47 in the indicating circuit 34. As the voltage producing the pulses is regulated and as the transistor 45 produces a good square wave approximation, the average current indicated by the meter 47 represents the pulse time width. The time width of the pulses is therefore purely a function of frequency because the pulse is initiated always at a fixed time after a first zero crossing and then is terminated with the second zero crossing. In a preferred embodiment of this invention, the fixed time interval is chosen so that the pulse is initiated near the end of the half-cycle.

For purposes of explanation, FIGS. 3A and 4A show alternating currents of increasing frequencies. Capacitor charging voltages represented by graphs 61 and 62 have the same wave shape as the charging voltages represented by the graphs 54 and 57 in FIGS. 2A and 2B. Therefore, they produce a pulse which begins at the same time delay after the zero crossings of the respective half-waves. However, as the subsequent zero crossing occurs after a shorter time interval, the pulse time width is decreased.

Figure 5:
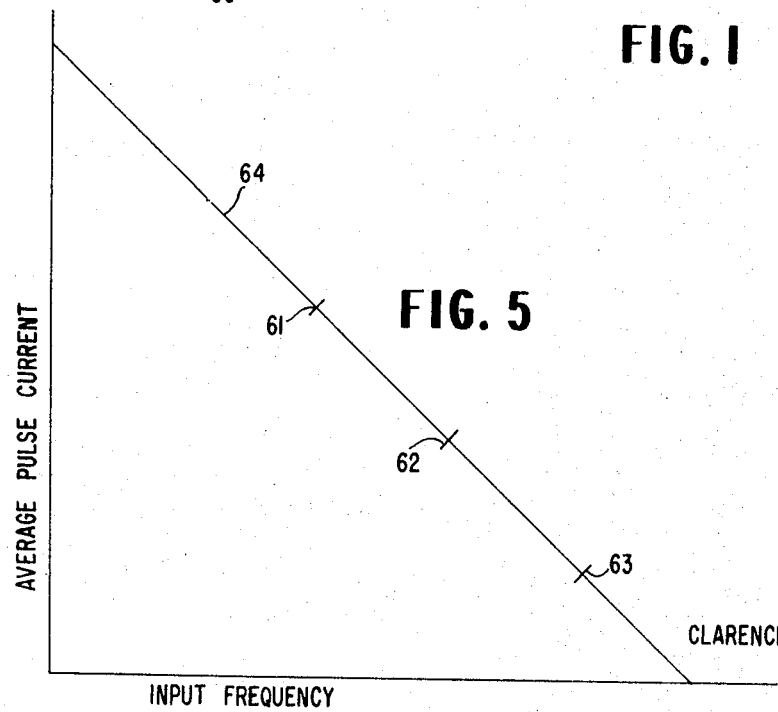
FIG. 5 shows the relationship of the output indication of the frequency transducer to the input frequency.

An analysis of this circuitry shown in FIG. 1 and the graphs shown in FIGS. 2, 3 and 4 shows that the average current in the indicating circuit 34 represented by the reading of the meter 47 decreases as the frequency increases. Referring to FIG. 5, three graph points 61, 62, and 63 have been plotted on an arbitrary scale. Graph point 61 represents the average pulse current produced by the alternating input signal shown in FIG. 2A while graph points 62 and 63 represent the alternating current input signals shown in FIGS. 3 and 4, respectively. A graph 64 through these points reveals that the average pulse current is a straight line function of the applied frequency having a negative slope. An analysis of FIG. 5 shows that this circuit is limited to a particular range of frequencies depending upon the value of the components.

An embodiment of a frequency transducer as revealed in FIG. 1 particularly adapted to monitor a frequency region for 60 hertz input signals has been constructed using the following components:

Zener diodes 24, 25, IN755 (7.5 v.)
Capacitor 40, 0.047 mfd.
Resistor 41, 270K D.I.T.
Resistors 43, 44, 10K
Transistor 45, 2N4249
Variable resistor 46, 2K–3K
Meter 47, 0–1 ma.

Frequency transducers constructed in accordance with this invention provide an economy of parts because the comparator circuits 31 and 32 and the zero crossing sensing circuits 35 and 36 can be constituted by relatively inexpensive components. By utilizing symmetrical circuitry which is sensitive to zero crossings of the applied input signal, the frequency transducer becomes insensitive to the effect of normally encountered harmonic signals superimposed on the alternating signal applied to the input terminals. Using a pulse generating circuit as a source of the frequency indicating signal which is basically a constant amplitude square wave permits flexibility in indicating circuit design because a wide variation in pulse amplitudes can be obtained without varying the remainder of the components. Further, by using a pulse to indicate the frequency and by initiating that pulse a fixed time after a zero crossing, it is possible to obtain accurate readings. In addition, a slight change in frequency will produce a greater percent change in the average output current than would be obtained if a full wave were measured.

It will be obvious to those skilled in the art that many modifications can be made to this circuit wthout departing from the true spirit and scope of this invention. Therefore, it is the object of the appended claims to cover all such modifications which do fall within the true spirit and scope of the invention.

What is claimed as new and desired to be secured by Letters Patent of the United States is:

1. A frequency transducer adapted to be energized by an alternating current signal to indicate the frequency thereof independent of the wave shape of said signal, said transducer comprising:
  (a) sensing means responsive to positive going and negative going zero crossings of the A-C signal;
  (b) pulse generating means connected to said sensing means, said sensing means causing said pulse generating means to initiate a pulse a fixed time after one of the zero crossings and to terminate the pulse with the other of said zero crossings; and
  (c) indicating means measuring the time length of said pulse, the time length of said pulse decreasing with increasing frequency of the applied A-C signal.

2. A frequency transducer adapted to be energized by an alternating current signal to indicate the frequency thereof comprising:
  (a) sensing means responsive to positive going and negative going zero crossings of the A-C signal, said sensing means including
    (i) timing means for providing a timing signal,
    (ii) shunting means connected to said timing means to alternately enable and disable said timing means during alternate half cycles, said shunting means acting in response to zero crossings of the A-C signal,
    (iii) fixed signal generating means, and
    (iv) comparator means connected to said timing means and said fixed signal generating means for producing an energizing signal when the timing signal exceeds the fixed signal;
  (b) pulse generating means connected to said sensing means, said sensing means causing said pulse generating means to initiate a pulse upon occurrence of the energizing signal and to terminate the pulse with the next zero crossing; and
  (c) indicating means measuring the time length of the pulse, the time length of the pulse decreasing with increasing frequency of the applied A-C signal.

3. A frequency transducer as recited in claim 2 wherein said fixed signal generating means comprises rectifying means adapted to be energized by the A-C signal and D-C regulator means for producing first and second regulated D-C voltages, said first D-C voltage constituting the fixed signal.

4. A frequency transducer as recited in claim 3 wherein said timing circuit is constituted by a resistor and a capacitor adapted to be energized by said second D-C voltage, said shunting means shorting said capacitor on alternate half-cycles of the alternating current signal.

5. A frequency transducer as recited in claim 4 wherein said comparator means comprises a transistor connected to said voltage regulator means and to said timing circuit to be energized when said timing signal exceeds the first reference signal.

6. A frequency transducer as recited in claim 5 wherein said shunting means is constituted by a second transistor having its emitter and collector electrodes connected in parallel with said timing means capacitor and its base electrode coupled to the alternating current voltage.

7. A frequency transducer as recited in claim 2 wherein said pulse generating means produces a constant amplitude current pulse.

8. A frequency transducer as recited in claim 7 wherein said indicating means is in series with said pulse generating means and wherein said pulse generating means includes a transistor adapted to be switched on and off by said comparator means.

9. A frequency transducer adapted to be energized by an alternating current signal to indicate the frequency thereof comprising:
  (a) sensing means responsive to positive-going and negative-going zero crossings of the A-C signal, said sensing means including
    (i) first and second timing means for providing first and second timing signals, first and second shunting means connected to said first and second timing means, respectively, to alternately enable and disable each of said timing means during alternate half cycles and responsive to zero crossings of the A-C signal whereby one of said timing means is energized during each half cycle,
    (ii) fixed signal generating means, and
    (iii) first and second comparator means connected respectively to said first and second timing means, both said comparator means being connected to said fixed signal generating means for generating an energization signal on alternate half-cycles when a respective timing signal exceeds the fixed signal;
  (b) pulse generating means connected to said first and second comparator means for initiating a pulse upon occurrence of the energizing signal and for terminating the pulse at the next zero crossing; and
  (c) indicating means measuring the time length of said pulse, the time length of said pulse decreasing with increasing frequency of the applied A-C signal.

10. A frequency transducer as recited in claim 9 wherein said fixed signal generating means includes:
    (i) a rectifier adapted to be energized by the alternating current signal; and
    (ii) voltage regulating means for providing first and second regulated D-C voltages, said first D-C voltage being said fixed signal, said second regulated D-C voltage energizing said first and second timing circuits, each of said timing circuits including a resistor and a capacitor in series, said first and second shunting means shorting each of said capacitors on alternate half-cycles.

11. A frequency transducer as recited in claim 10 wherein said first and second shunting means include first and second transistors, said first transistor being connected to shunt said capacitor in said first timing circuit and adapted to be controlled by the A-C signal, said second transistor being connected to shunt said capacitor in said second timing circuit and being adapted to be controlled by the A-C signal whereby said first and second transistors are alternately conducting on opposite half-cycles of the applied A-C signal.

12. A frequency transducer as recited in claim 11 including first and second comparator transistors, the base electrodes of each of said first and second comparator transistors being energized by the voltages across said first and second capacitors, respectively, the emitters of said first and second comparator transistors being energized by said first regulated voltage and said collectors of said first and second comparator transistors being commonly connected to control said pulse generating means.

13. A frequency transducer adapted to be energized by an alternating current signal to indicate the frequency of that alternating current signal comprising:
  (a) rectifier means adapted to be energized by the A-C signal;
  (b) voltage regulator means connected to said rectifier means for producing first and second regulated direct current voltages;
  (c) pulse generating means comprising a transistor having emitter, collector and base electrodes;
  (d) an indicating circuit for measuring average current connected in series with said pulse generating means transistor collector electrode, said pulse generating means transistor being energized by said second regulated voltage;
  (e) first and second comparator circuits adapted to control the operation of said pulse generating means on alternate half-cycles, each of said comparator circuits including a transistor having collector, emitter and base electrodes, said collector electrodes being resistively coupled to the base electrode of said pulse generating means transistor and said emitter electrodes being coupled to said voltage regulating means to be energized by said first regulated voltage;

(f) first and second timing circuits each comprising a resistor and a capacitor in series and connected to said voltage regulating circuit to be energized by said second regulated voltage, said first and second comparator transistor base electrodes being connected to said first and second timing circuits, respectively, to be energized by said capacitor voltages; and (g) first and second shunting transistors, the collector and emitter electrodes of said first and second shunting transistors being connected in parallel with said first and second timing circuit capacitors, respectively, and the base electrodes of said first and second shunting transistors adapted to be energized by the alternating current signal, said first shunting transistor being energized during one half-cycle and said second shunting transistor being energized during the other half-cycle, said pulse generating means thereby producing a pulse having a time length which decreases linearly as the frequency of the applied alternating current signal increases.

References Cited
UNITED STATES PATENTS

| | | | |
|---|---|---|---|
| 2,955,202 | 10/1960 | Scourtes | 324—78(E)(UX) |
| 3,068,420 | 12/1962 | Smith | 324—78(E)(UX) |
| 3,369,178 | 2/1968 | Wilson | 324—78(1)X |
| 3,018,386 | 1/1962 | Chase | 307—290X |
| 3,350,637 | 10/1967 | Pochtar | 324—78(D) |

FOREIGN PATENTS

| | | | |
|---|---|---|---|
| 1,198,927 | 8/1965 | Germany | 324—78 |

ALFRED E. SMITH, Primary Examiner